United States Patent
Ichinose

(10) Patent No.: US 10,661,887 B2
(45) Date of Patent: May 26, 2020

(54) MOTOR AND PROPELLER THRUST GENERATING DEVICE

(71) Applicant: Nidec Corporation, Kyoto (JP)

(72) Inventor: Takeshi Ichinose, Kawasaki (JP)

(73) Assignee: NIDEC CORPORATION, Kyoto (JP)

( * ) Notice: Subject to any disclaimer, the term of this patent is extended or adjusted under 35 U.S.C. 154(b) by 468 days.

(21) Appl. No.: 15/418,861

(22) Filed: Jan. 30, 2017

(65) Prior Publication Data

US 2017/0217566 A1    Aug. 3, 2017

(30) Foreign Application Priority Data

| Feb. 3, 2016 | (JP) | 2016-018566 |
| Feb. 26, 2016 | (JP) | 2016-035603 |
| Mar. 25, 2016 | (JP) | 2016-061436 |
| Jun. 13, 2016 | (JP) | 2016-117235 |
| Jan. 24, 2017 | (JP) | 2017-010338 |

(51) Int. Cl.
| H02K 7/14 | (2006.01) |
| B64C 11/48 | (2006.01) |
| B64C 11/18 | (2006.01) |
| B64C 27/10 | (2006.01) |
| H02K 7/08 | (2006.01) |
| H02K 5/22 | (2006.01) |
| H02K 1/12 | (2006.01) |

(52) U.S. Cl.
CPC ............. *B64C 11/48* (2013.01); *B64C 11/18* (2013.01); *B64C 27/10* (2013.01); *H02K 1/12* (2013.01); *H02K 5/225* (2013.01); *H02K 7/08* (2013.01); *H02K 7/14* (2013.01)

(58) Field of Classification Search
CPC .... F04D 19/007; F04D 19/024; F04D 29/601; B64C 11/08; H02K 7/08; H02K 7/14
See application file for complete search history.

(56) References Cited

U.S. PATENT DOCUMENTS

| 5,135,365 | A | * | 8/1992 | Bogage | ................. F04D 25/088 416/244 R |
| 6,244,818 | B1 | | 6/2001 | Chang | |
| 6,626,653 | B2 | | 9/2003 | Lin et al. | |
| 6,652,230 | B1 | * | 11/2003 | Huang | ..................... F01D 1/02 415/193 |
| 6,663,342 | B2 | | 12/2003 | Huang et al. | |
| 7,014,420 | B2 | | 3/2006 | Chang | |

(Continued)

FOREIGN PATENT DOCUMENTS

| CN | 2926569 Y | 7/2007 |
| CN | 201663509 U | 12/2010 |

(Continued)

*Primary Examiner* — Patrick Hamo

(74) *Attorney, Agent, or Firm* — Keating & Bennett

(57) ABSTRACT

A motor includes a fixed shaft, a first rotor supported by the fixed shaft in a rotatable manner relative to the fixed shaft, a first stator fixed to the fixed shaft and applying rotation torque that rotates the first rotor toward one side in a circumferential direction of the fixed shaft, a second rotor provided at a position different from a position of the first rotor in an axial direction in a rotatable manner relative to the fixed shaft, and a second stator fixed to the fixed shaft and applying rotation torque that rotates the second rotor toward another side in a circumferential direction of the fixed shaft.

22 Claims, 11 Drawing Sheets

(56) References Cited

U.S. PATENT DOCUMENTS

| | | | |
|---|---|---|---|
| 7,059,830 B2 | 6/2006 | Huang et al. | |
| 7,078,844 B2 | 7/2006 | Chang et al. | |
| 7,156,611 B2 * | 1/2007 | Oosawa | F04D 19/007 415/199.5 |
| 7,238,004 B2 * | 7/2007 | Lin | F01D 1/02 415/182.1 |
| RE39,774 E | 8/2007 | Chang | |
| 7,740,446 B2 | 6/2010 | Lin et al. | |
| 7,798,771 B2 | 9/2010 | Chang et al. | |
| 7,872,381 B2 | 1/2011 | Watanabe et al. | |
| 7,874,796 B2 | 1/2011 | Chang et al. | |
| 7,942,627 B2 | 5/2011 | Jin | |
| 7,946,804 B2 | 5/2011 | Yoshida | |
| 8,079,801 B2 | 12/2011 | Yoshida et al. | |
| 8,226,350 B2 | 7/2012 | Hayashigaito et al. | |
| 8,297,914 B2 | 10/2012 | Chang et al. | |
| 8,322,998 B2 | 12/2012 | Hanaoka et al. | |
| 8,360,735 B2 * | 1/2013 | Hanaoka | F04D 27/004 310/112 |
| 8,668,477 B2 | 3/2014 | Wu et al. | |
| 8,684,688 B2 | 4/2014 | Wu et al. | |
| 8,727,717 B2 * | 5/2014 | Hsu | F04D 25/0613 415/199.5 |
| 8,951,012 B1 * | 2/2015 | Santoro | F04D 19/024 416/124 |
| 2002/0122733 A1 | 9/2002 | Lin et al. | |
| 2006/0034688 A1 | 2/2006 | Kupferberg | |
| 2007/0173190 A1 | 7/2007 | Hsu et al. | |
| 2007/0224039 A1 | 9/2007 | Hsu et al. | |
| 2007/0284955 A1 | 12/2007 | Chang et al. | |
| 2008/0286135 A1 | 11/2008 | Yoshida et al. | |
| 2009/0035154 A1 | 2/2009 | Hsu et al. | |
| 2010/0054931 A1 | 3/2010 | Yoshida | |
| 2012/0134856 A1 * | 5/2012 | Wu | F04D 19/002 417/350 |
| 2012/0257957 A1 * | 10/2012 | Yanagisawa | F04D 19/007 415/61 |
| 2014/0086761 A1 * | 3/2014 | Abe | F04D 19/007 417/338 |
| 2015/0086351 A1 | 3/2015 | Chang et al. | |
| 2015/0219398 A1 * | 8/2015 | Santoro | F28C 3/08 62/314 |
| 2015/0233391 A1 | 8/2015 | Liu | |
| 2015/0233392 A1 | 8/2015 | Liu | |
| 2016/0097394 A1 * | 4/2016 | Golm, Jr. | F04D 19/007 417/423.1 |
| 2016/0167778 A1 * | 6/2016 | Meringer | B64C 27/10 244/17.23 |
| 2017/0204869 A1 * | 7/2017 | Horng | F04D 25/0693 |
| 2018/0141647 A1 * | 5/2018 | Suzuki | B64C 27/08 |
| 2019/0016435 A1 * | 1/2019 | Nys Ter | B64C 1/30 |
| 2019/0161179 A1 * | 5/2019 | Uebori | B64C 11/32 |

FOREIGN PATENT DOCUMENTS

| | | |
|---|---|---|
| CN | 202068274 U | 12/2011 |
| CN | 101820209 A | 11/2012 |

* cited by examiner

MOTOR AND PROPELLER THRUST GENERATING DEVICE

CROSS REFERENCE TO RELATED APPLICATIONS

This application claims the benefit of priority to Japanese Patent Application No. 2016-018566 filed on Feb. 3, 2016, Japanese Patent Application No. 2016-035603 filed on Feb. 26, 2016, Japanese Patent Application No. 2016-061436 filed on Mar. 25, 2016, Japanese Patent Application No. 2016-117235 filed on Jun. 13, 2016, and Japanese Patent Application No. 2017-010338 filed on Jan. 24, 2017. The entire contents of these applications are hereby incorporated herein by reference.

BACKGROUND OF THE INVENTION

1. Field of the Invention

The present invention relates to a motor and a propeller thrust generating device.

2. Description of the Related Art

In recent years, multicopters that drive rotor blades with electric motors to fly have been used in various ways. However, since a battery capacity of a multicopter is restricted, a continuous flight time, a cruising distance, the weight of a loadable cargo, or the like is limited and thus the applications of multicopters are limited.

SUMMARY OF THE INVENTION

Preferred embodiments of the present invention improve efficiency of a propeller thrust generating device driven by an electric motor.

A motor according to a preferred embodiment of the present includes: a columnar fixed shaft; a first rotor supported by the fixed shaft in a rotatable manner relative to the fixed shaft; a second rotor supported by the fixed shaft in a position different from a position of the first rotor in an axial direction in a rotatable manner relative to the fixed shaft; a first stator fixed to the fixed shaft and applying rotation torque that rotates the first rotor toward one side in a circumferential direction of the fixed shaft; and a second stator fixed to the fixed shaft applying rotation torque that rotates the second rotor toward another side in a circumferential direction of the fixed shaft. The first stator and the second stator are side by side along a direction in which the fixed shaft extends.

An interval between the first rotor and the second rotor is smaller than both of an axial direction height of the first stator and an axial direction height of the second stator.

According to preferred embodiments of the present invention, it is possible to obtain a propeller thrust generating device having high efficiency.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
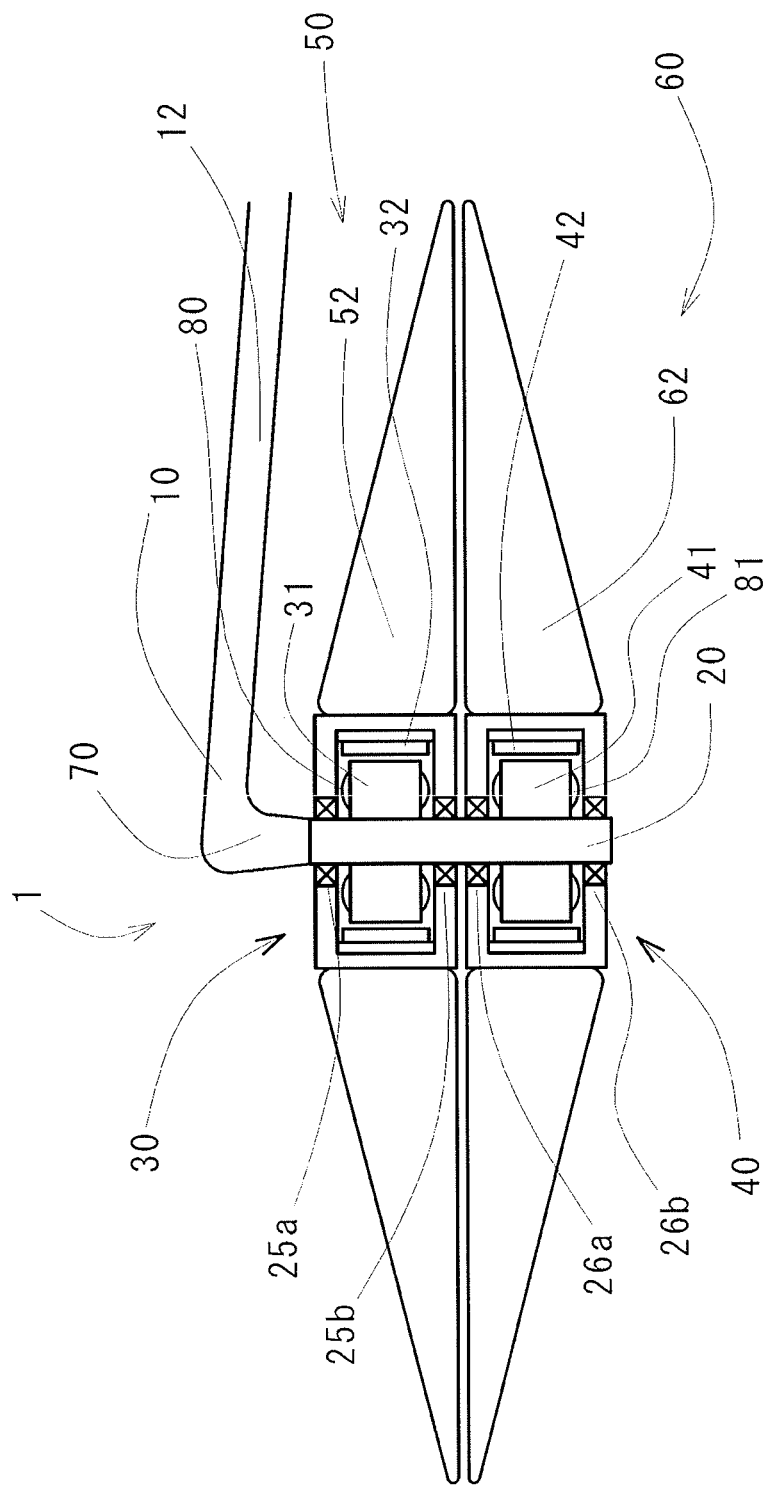
FIG. 1 is an axial direction sectional view schematically showing a basic configuration of a propeller thrust generating device according to a first preferred embodiment of the present invention.

It is known that a high energy efficiency for converting input energy into propulsion is possible in a thrust generating device including a counter-rotating propeller which rotates a coaxially-disposed pair of rotor blades in opposite directions. However, when such a counter-rotating propeller mechanism is driven by an internal combustion engine such as a turboprop engine, a gear mechanism that reverses a rotating direction is necessary and the structure of the counter-rotating propeller mechanism is complicated. Therefore, the counter-rotating propeller mechanism is relatively rarely adopted with an internal combustion engine.

On the other hand, when rotator blades are driven by electric motors, two motors are fixed back to back and are respectively rotated. Consequently, it is possible to more easily realize the thrust generating device of the counter-rotating propeller using electric motors.

However, in order to fix the motors back to back, an additional fixing structure is necessary, which increases weight. The additional structure is preferably located between the two coaxially disposed rotors such that the two rotors cannot be disposed to be very close to each other. In the thrust generating device including the counter-rotating propeller, efficiency will become higher as a gap between the two propellers is smaller. Therefore, the restriction that the two rotors cannot be disposed close to each other as explained above diminishes an advantage of adopting the counter-rotating structure.

In a motor of the thrust generating device of the counter-rotating propeller according to preferred embodiments of the present invention, two motors are provided on one shaft. Therefore, two rotors are able to be disposed close to each other in the axial direction. A fixing structure necessary in fixing the two motors is able to be omitted.

Motors according to preferred embodiments of the present invention are preferred to provide propeller thrust generating devices of the present invention. However, the motors of the present invention are not limited to this use and are applicable to many other uses in which two rotors need to be disposed close to each other.

In the following explanation, an axial direction sectional view indicates a sectional view of a motor or a propeller thrust generating device taken along a surface including the center axis of a shaft. When a direction is simply described as axial direction without being particularly limited, the direction indicates a direction extending along the center axis of the shaft. In the present disclosure, the center axis of the shaft coincides with a rotation axis of a rotor supported by the shaft.

Note that respective blades defining a rotor blade spread radially. Therefore, in an axial direction cross section of the entire propeller thrust generating device, only a portion of the blades are shown. However, in the sectional views of the present application, for convenience, a form of the blades viewed from a lateral direction is shown rather than a cross section to make it is easy to grasp the shape of the entire blades.

First Preferred Embodiment

Figure 11:
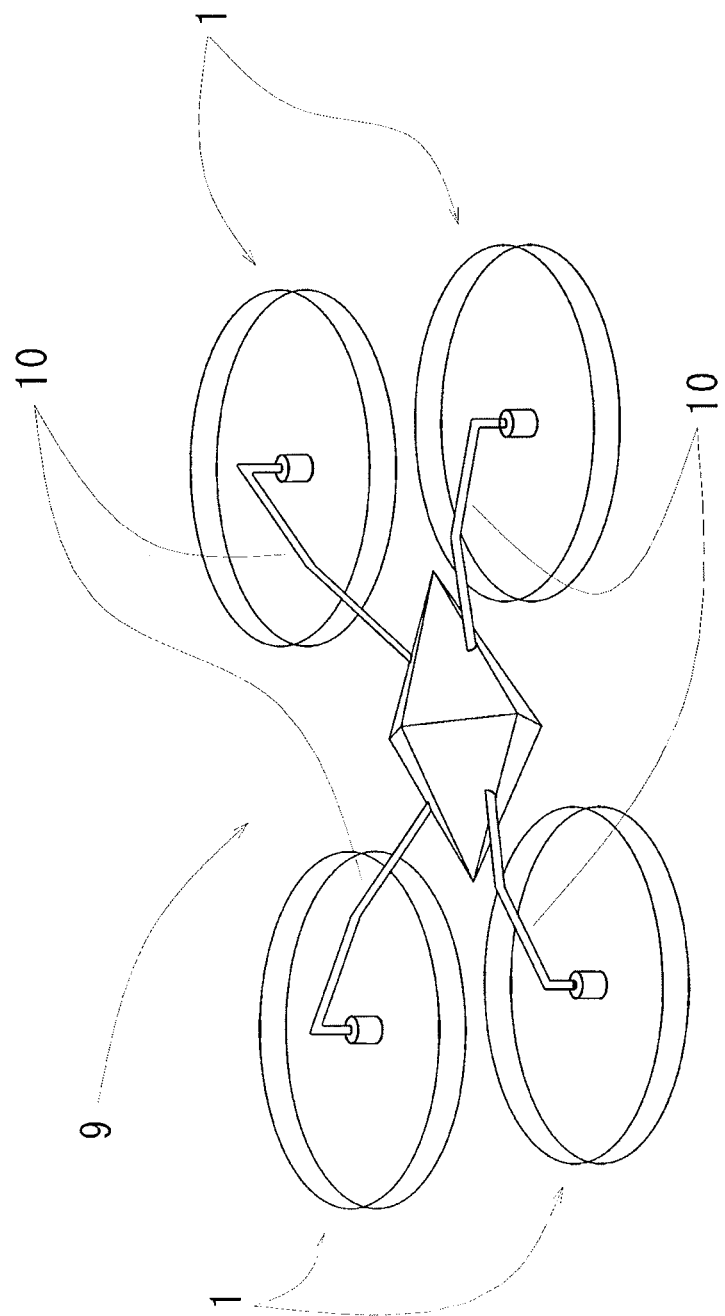
FIG. 11 is a schematic diagram showing an overall view of a multicopter mounted with propeller thrust generating devices according to a preferred embodiment of the present invention.

FIG. 1 shows an axial direction sectional view of a propeller thrust generating device 1 according to a first preferred embodiment of the present invention. A fixed shaft 20 of the propeller thrust generating device 1 is attached to the distal end portion of a supporting arm 10, which secures the fixed shaft 20 to a multicopter 9. The multicopter 9 preferably includes a plurality of propeller thrust generating devices 1, as shown in FIG. 11.

The multicopter 9 preferably includes, for example, four counter-rotating propeller thrust generating devices 1. The multicopter 9 is thus able to obtain thrust and, at the same time, cancel a force rotating an entire machine body with reaction of rotary blades.

An electric propeller thrust generating device 1 is preferably disposed on the lower side of a supporting arm. However, the electric propeller thrust generating device 1 may be disposed on the upper side. When the electric propeller thrust generating device 1 is disposed on the upper side of the supporting arm, a downward air current generated by the counter-rotating propeller thrust generating device 1 sometimes hits the supporting arm to cancel a portion of upward thrust. Therefore, the electric propeller thrust generating device is desirably disposed on the lower side of the supporting arm.

Referring back to FIG. 1, the propeller thrust generating device 1 is explained. In FIG. 1, a first rotor 30 and a second rotor 40 are preferably arranged along the axial direction of the fixed shaft 20. The first rotor 30 and the second rotor 40 respectively include rotor magnets 32 and 42. A first stator 31 and a second stator 41 are preferably disposed on the inner sides of the rotor magnets 32 and 42. The outer circumferential surfaces of the first stator 31 and the second stator 41 are respectively opposed to the rotor magnets 32 and 42. The first stator 31 and the second stator 41 preferably respectively include a first coil 80 and a second coil 81.

A first bearing 25a, a second bearing 25b, a third bearing 26a, and a fourth bearing 26b are preferably attached to the fixed shaft 20 and are arranged in this order from the top of the fixed shaft 20 in FIG. 1. The first stator 31 is located between the first bearing 25a and the second bearing 25b. The second stator 41 is located between the third bearing 26a and the fourth bearing 26b. As the bearing, a general ball bearing can preferably be used, but any other desirable kind of bearing such as a fluid dynamic pressure bearing could also be used. In the case of ball bearings, inner rings of the bearings are attached to the fixed shaft 20. On the other hand, outer rings of the bearings are respectively attached to the first rotor 30 and the second rotor 40.

A gap is provided between the first rotor 30 and the second rotor 40 to enable the first rotor 30 and the second rotor 40 to freely rotate. The size of the gap is preferably smaller than both of the axial direction height of the first stator 31 and the axial direction height of the second stator 41. In the first preferred embodiment, the size of the gap is smaller than an interval between the first stator 31 and the second stator 41 and equal to an interval between the second bearing 25b and the third bearing 26a.

The first stator 31 and the second stator 41 respectively generate rotating magnetic fields according to energization to the first coil 80 and the second coil 81 and apply rotation torques to the rotor magnets 32 and 42. When the motor 1 is used for the propeller thrust generating device 1, the motor 1 is able to apply rotational torques in opposite directions to the rotor magnets 32 and 42. For example, when the motor 1 is seen through from the upper direction toward the lower direction in FIG. 1, the first stator 31 applies clockwise rotation torque to the rotor magnet 32 and the second stator 41 applies counterclockwise rotation torque to the rotor magnet 42. Such driving is effective in improving energy efficiency of the propeller thrust generating device 1.

The fixed shaft 20 is preferably a bar or a cylinder, the outer circumferential surface of which has a cylindrical surface shape. However, at least a portion of the outer circumferential surface may have a rectangular shape. When the outer circumferential surface has a rectangular shape, a structure which stops rotation of the first stator 31 and the second stator 41 is able to be easily introduced. As a material of the fixed shaft 20, carbon fiber reinforced plastics can be used. An aluminum alloy or steel can also be used. However, the material forming the fixed shaft 20 is not limited to these materials and could be any desirable material.

The first rotor 30 preferably includes a first rotor blade 50 including a plurality of blades 52 of a first kind extending outward in the radial direction from the outer circumferential surface of the first rotor 30. The second rotor 40 includes a second rotor blade 60 including a plurality of blades 62 of a second kind extending outward in the radial direction from the outer circumferential surface of the second rotor 40. Edges at the axial direction lower ends of the respective blades 52 of the first kind defining the first rotor blade 50 are located farther on the lower side than the axial direction lower end of the first stator 31 in bases of the blades. In the first preferred embodiment, the bases coincide with the lower end of the first rotor 30. Edges at the axial direction upper ends of the respective blades 62 of the second kind defining the second rotor blade 60 are located farther on the upper side than the axial direction upper end of the second stator 41 in bases of the blades. In the first preferred embodiment, the bases preferably coincide with the upper end of the second rotor 40.

By adopting such a configuration, a gap between the first rotor blade 50 and the second rotor blade 60 decreases. It is possible to improve efficiency of the propeller thrust generating device 1.

The motor 1 according to the present preferred embodiment may further include the supporting arm 10. When the motor 1 includes the first rotor blade 50 and the second rotor blade 60, the motor 1 is a portion of the propeller thrust generating device 1. The propeller thrust generating device 1 may also further include the supporting arm 10.

The supporting arm 10 includes a main section 12 extending in a direction crossing the axial direction of the fixed shaft 20. The main section 12 may be hollow. The motor 1 or the propeller thrust generating device 1 is supported from the lateral direction by the main section 12. The supporting arm 10 includes an attaching section 70 at the distal end portion of the main section 12. The fixed shaft 20 extending in the axial direction is fixed to the attaching section 70. An axial direction interval between the main section 12 of the supporting arm 10 and the blades 52 of the first kind in the bases of the blades 52 of the first kind defining the first rotor blade 50 is preferably larger than an interval between the blades 52 of the first kind and the blades 62 of the second kind in the bases. An axial direction dimension of the attaching section 70 is larger enough to achieve such a dimensional relation. By adopting such a dimensional relation, when the first rotor blade 50 rotates, disturbance of a flow of the air generated by passage right under the main section 12 decreases. Accordingly, it is possible to reduce noise with the above structure.

Second Preferred Embodiment

Figure 2:
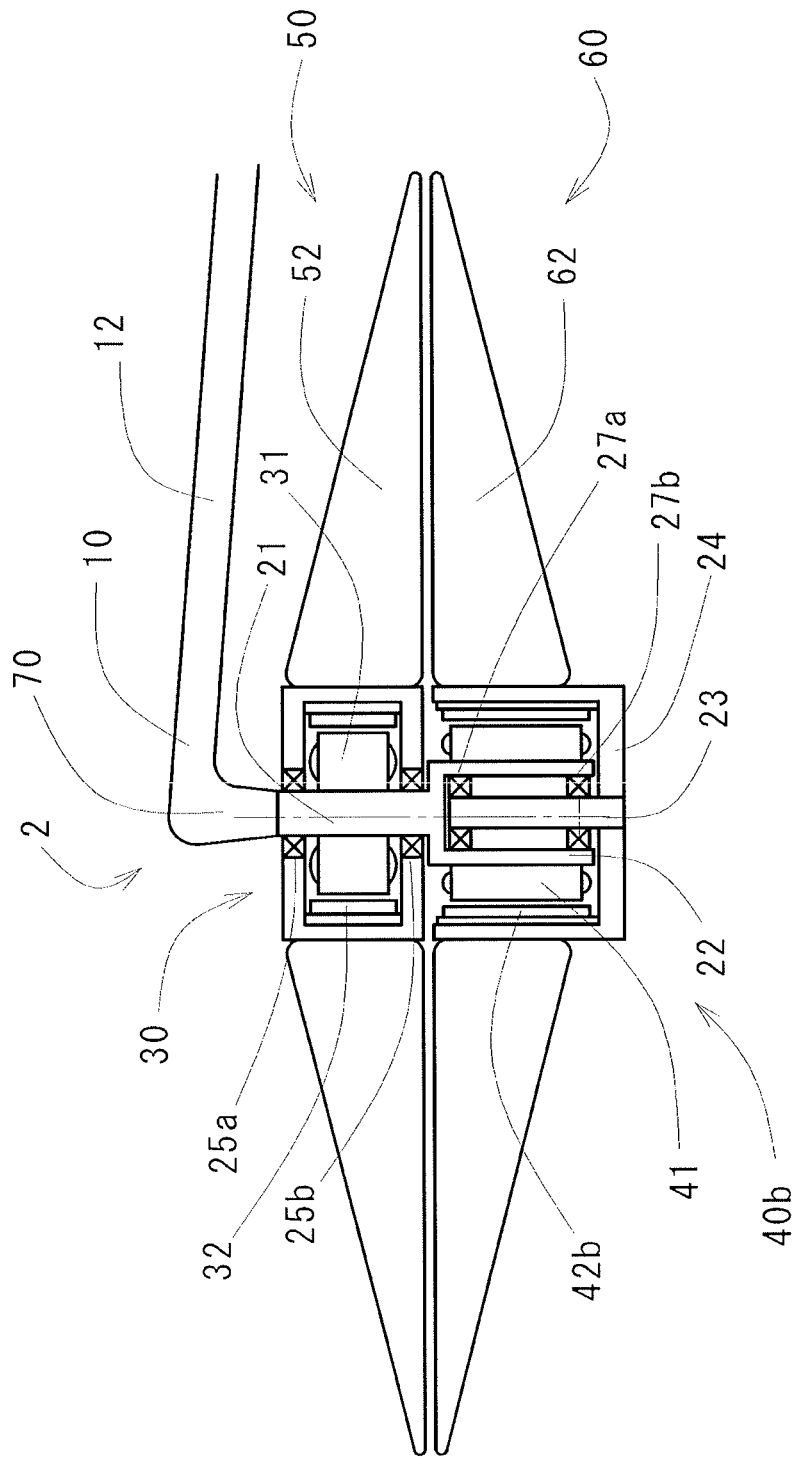
FIG. 2 is an axial direction sectional view schematically showing a basic configuration of a propeller thrust generating device according to a preferred embodiment of the present invention.

In FIG. 2, an axial direction sectional view of a propeller thrust generating device 2 according to a second preferred embodiment of the present invention is shown. In the second preferred embodiment, explanation is omitted concerning portions same as the portions in the first preferred embodiment. For example, the upper half of the device 2, that is, the first stator 31, the first rotor 30, the first rotor blade 50, the first bearing 25a, the second bearing 25b, and the like are preferably same as those in the first preferred embodiment. On the other hand, the lower half of the device 2 is different from the lower half of the device 1 in the first preferred embodiment.

In the second preferred embodiment, the lower half of a fixed shaft 21 is a hollow section 22 including a cylindrical inner surface. A rotating shaft 23 is housed on the inner side of the cylinder section 22. A third bearing 27a and a fourth bearing 27b are interposed between the rotating shaft 23 and the hollow cylinder section 22 and support the rotating shaft 23 in a rotatable manner relative to the hollow cylinder section 22. A second rotor 40b preferably includes a hub section 24 spreading in the radial direction. The hub section 24 is connected to the lower end portion of the rotating shaft 23 at the radial direction inner edge. A second stator 410 is fixed to the outer circumferential surface of the hollow cylinder section 22. The outer diameter of the hollow cylinder section 22 is larger than the diameter of a portion to which the first stator 31 of the fixed shaft 21 is fixed. On the other hand, the outer diameter of the second rotor 40b is preferably equal or substantially equal to the outer diameter of the first rotor 30. Therefore, the spread in the radial direction of a space in which the second stator 410 is housed is preferably smaller than the spread in the radial direction of a space in which the first stator 31 is housed. Therefore, a necessary volume of the second stator 410 is secured by increasing an axial direction dimension to be larger than the axial direction dimension of the first stator 31. According to the increase in the axial direction dimension of the second stator 410, the axial direction length of a second rotor magnet 42b is also larger than the axial direction length of the first rotor magnet 32.

In this way, the propeller thrust generating device 2 in the second preferred embodiment is different from the propeller thrust generating device 1 in the first preferred embodiment in a bearing structure that supports the second rotor 40b. However, the first rotor blade 50 and the second rotor blade 60 attached to the rotors are preferably the same as first rotor blade 50 and the second rotor blade 60 in the first preferred embodiment.

Third Preferred Embodiment

Figure 3:
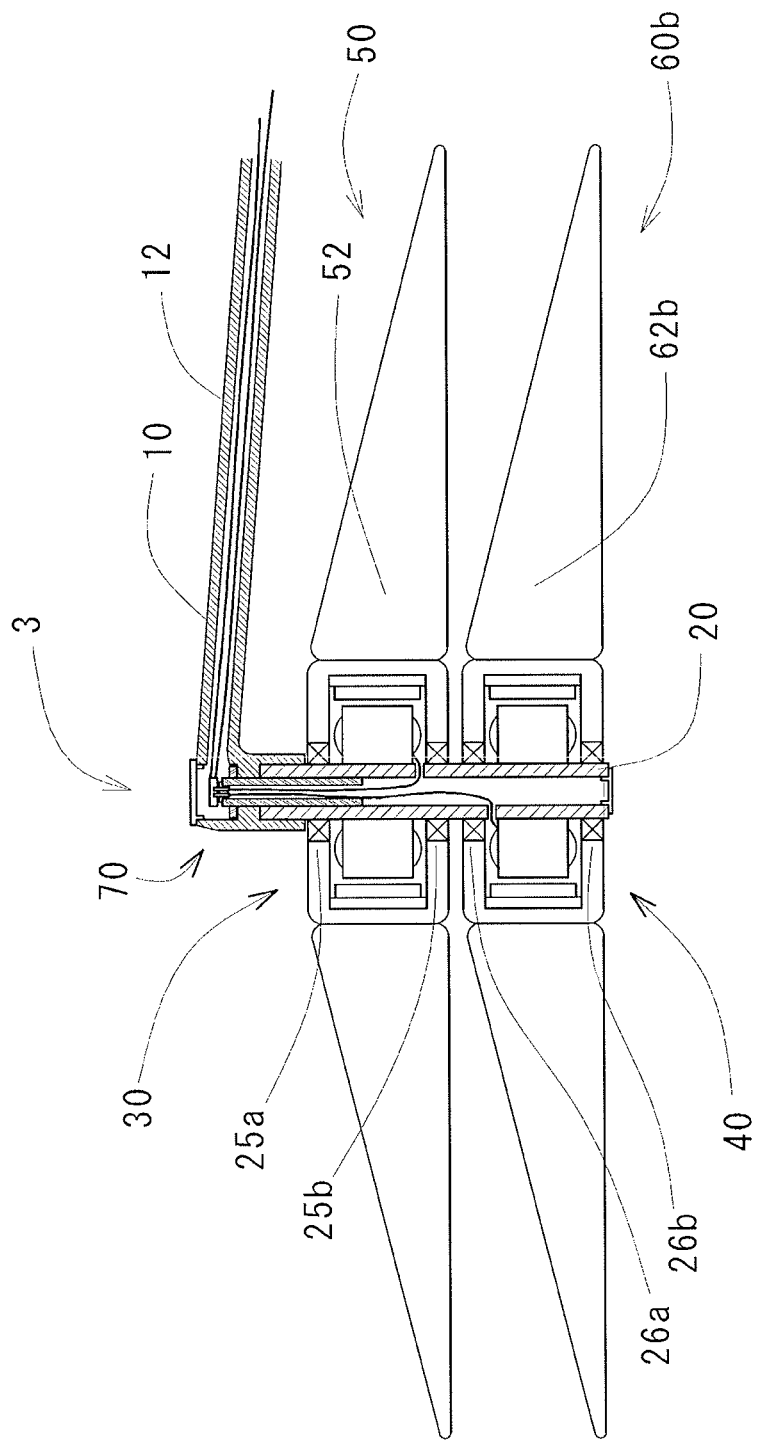
FIG. 3 is an axial direction sectional view schematically showing a basic configuration of a propeller thrust generating device according to a third preferred embodiment of the present invention.

An axial direction sectional view of a propeller thrust generating device 3 according to a third preferred embodiment of the present invention is shown in FIG. 3. First and second rotors and stators and bearings are preferably the same as the first and second rotors and stators and the bearings in the first preferred embodiment. Explanation of the first and second rotors and stators and the bearings is omitted. One of the unique features of this preferred embodiment is an attachment structure of the fixed shaft 20 to the supporting arm 10.

Figure 4:
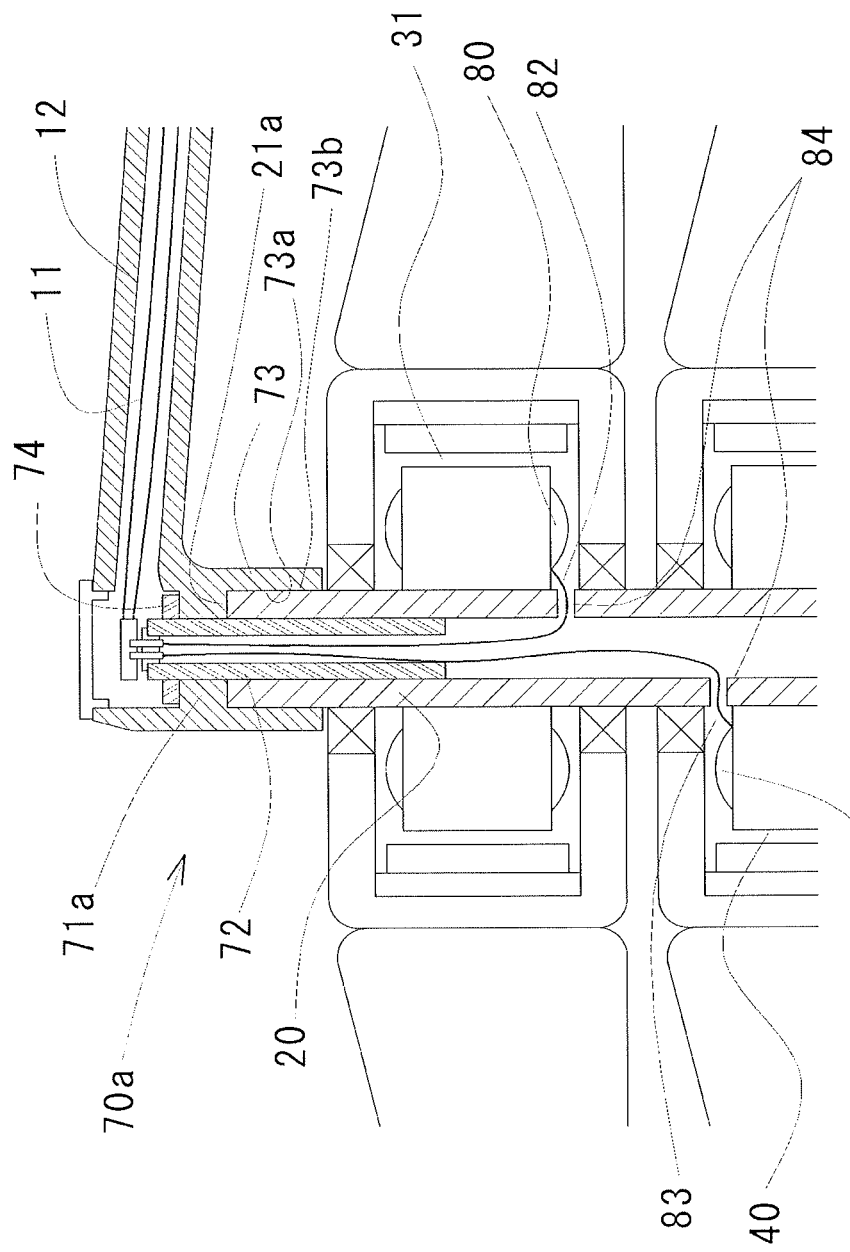
FIG. 4 is an enlarged view of a fixed section of the propeller thrust generating device according to the third preferred embodiment of the present invention.

In FIG. 4, an enlarged view of an attaching section 70a located at the distal end portion of the supporting arm 10 and the upper end portion of the fixed shaft 20 fixed to the attaching section 70a is shown.

The fixed shaft 20 is defined by a hollow cylinder and an inserted shaft 72 is housed in a hollow section at the upper end portion of the fixed shaft 20. The outer circumferential surface of the inserted shaft 72 is fixed to the inner circumferential surface of the fixed shaft 20. Screw grooves (not shown) are preferably cut on the outer circumferential surface of the inserted shaft 72 and the inner circumferential surface of the fixed shaft 20. The inserted shaft 72 is fixed to the fixed shaft 20 by the screw structure. The upper end portion of the inserted shaft 72 is fixed in a state in which the upper end portion projects upward from the fixed shaft 20. Therefore, an upper end surface 21a of the fixed shaft 20 surrounds the upper end portion of the inserted shaft 72. The attaching section 70a of the supporting arm 10 preferably includes a supporting-arm-side attaching section 73 including a cylindrical inner circumferential surface coaxial with the fixed shaft 20. The inner circumferential surface of the supporting-arm-side attaching section 73 and the outer circumferential surface 73b of the upper end portion of the fixed shaft 20 are fixed to each other in a state in which the inner circumferential surface and the outer circumferential surface are in contact with each other. At the upper end of the supporting-arm-side attaching section cylinder section 73, the attaching section 70a includes an inner circumferential rim 71a spreading to the radial direction inner side. A nut 74 is screwed onto the upper end portion of the inserted shaft 72. The nut 74 and the upper end surface 21a of the fixed shaft 20 vertically sandwich the inner circumferential rim 71a. The fixed shaft 20 is fixed to the supporting arm 10 by this structure. Since the inner circumferential surface of the cylinder section 73 and the outer circumferential surface 73b of the upper end portion of the fixed shaft 72 are fixed to each other in a state in which the inner circumferential surface and the outer circumferential surface are in contact with each other, it is possible to reduce deviation in a fixing direction of the fixed shaft 20 to the supporting arm 10.

To fix the fixed shaft 20 to the supporting arm 10, it is also possible to use a method other than the method explained above. Irrespective of which of the fixing methods is used, reliability of the fixing is improved in a use in which a driving action rotating the first rotor 30 and the second rotor 40 in opposite directions is adopted. When a driving action driving the first rotor 30 and the second rotor 40 in the same direction is adopted, if the two rotors are simultaneously driven, reactions of the two rotors are applied to a portion where the fixed shaft 20 is fixed to the supporting arm 10. In such a case, the fixing portion must have enough durability to resist the reaction forces of the two rotors. On the other hand, when a driving action driving the first rotor 30 and the second rotor 40 in opposite directions is adopted, at least a portion of reactions of the two rotors cancel each other because the rotors are driven in the opposite directions. Therefore, the reaction applied to the portion where the fixed shaft 20 is fixed to the supporting arm 10 decreases. Therefore, the durability of the fixing portion increases by the decrease in the reaction. Alternatively, necessary durability is able to be realized by a smaller fixing structure.

Both of a first lead wire 82 drawn out from the first coil 80 and a second lead wire 83 drawn out from the second coil 81 preferably extend to the inner side of the fixed shaft 20 through a through-hole 84 provided on the side surface of the fixed shaft 20 and subsequently reach the upper end of the inserted shaft 72 through the inner side of the inserted shaft 72. End portions of the first and second lead wires 82 and 83 are connected to an end portion of a power supply line 11 wired through the inner side of the main section 12 of the supporting arm 10. In the connection, both the lead wires are preferably connected by soldering or the like. Connectors may be connected to the end portions of the lead wires in advance. The lead wires may be connected by fastening the connectors.

The first lead wire 82 which supplies electric power to the first stator 31 is drawn out into the fixed shaft 20 from the first stator 31 through a through-hole opened on the fixed shaft 20 below the first stator 31. Such arrangement is selected in order to avoid the inserted shaft 72.

Figure 5:
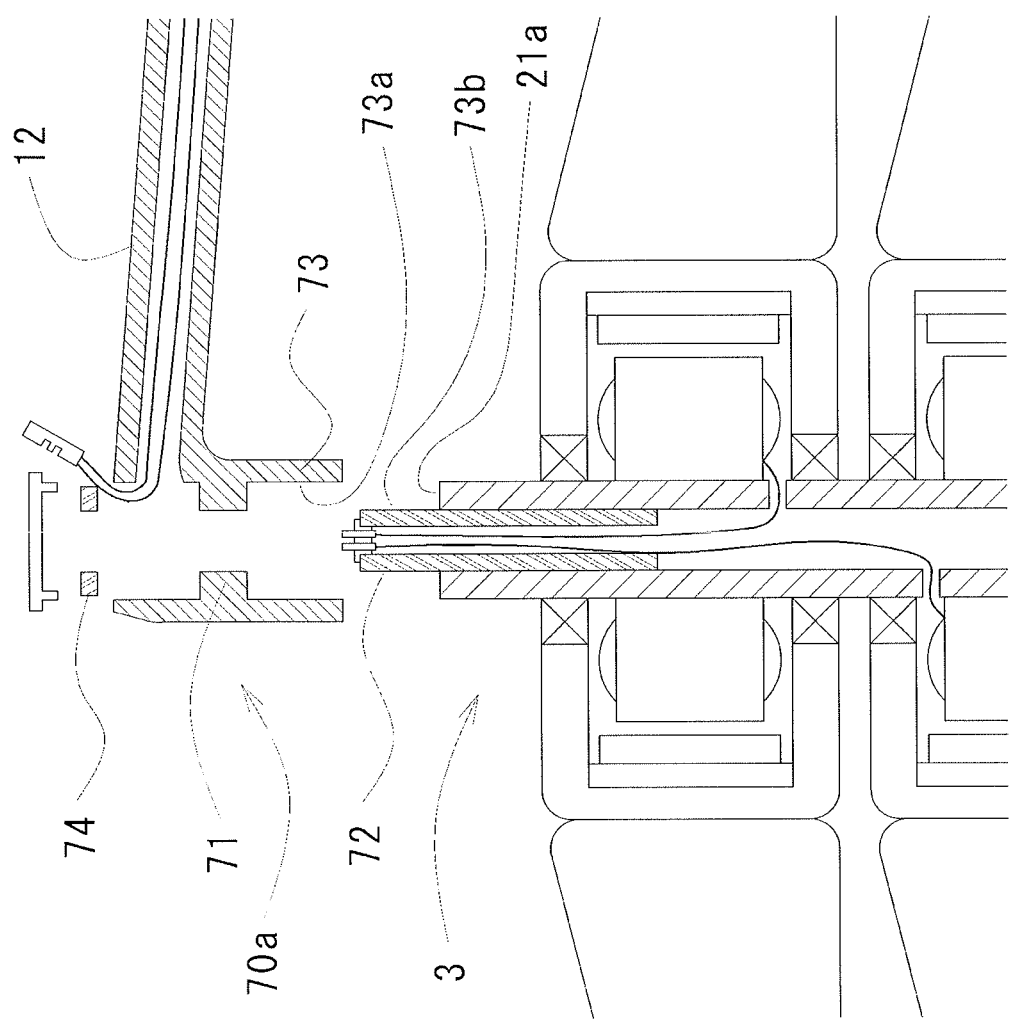
FIG. 5 is an exploded view of the fixed section of the propeller thrust generating device according to the third preferred embodiment of the present invention.

FIG. 5 shows a state in which the attaching section 70*a* and the fixed shaft 20 shown in FIG. 4 are disassembled. In the state in which the fixed shaft 20 is separated from the attaching section 70*a*, the propeller thrust generating device 3 is able to be transported and managed in a state in which the propeller thrust generating device 3 is separated from the multicopter 9. Therefore, it is easy to perform maintenance and repairing work of the propeller thrust generating device 3.

Note that, concerning the propeller thrust generating device 3, in the above explanation, as an example, the fixed shaft 20 and the inserted shaft 72 are separate members. However, it is not essential that the fixed shaft 20 and the inserted shaft 72 are the separate members. The fixed shaft 20 and the inserted shaft 72 may be one monolithic member. In that case, the upper end surface 21*a* is preferably formed by a method of, for example, thinning the outer circumference of one end portion of one shaft by cutting or the like. If the inner circumferential rim 71*a* can be held and fixed between the upper end face 21*a* and the nut 74, it is possible to realize the fixing structure according to a preferred embodiment of the present invention.

A rotor blade of the propeller thrust generating device 3 in the third preferred embodiment is preferably different from the propeller thrust generating device 1 in the first preferred embodiment. In the first preferred embodiment, an axial direction gap between the axial direction lower end edge of the first rotor blade 50 and the axial direction upper end edge of the second rotor blade 60 is the same from the bases where the blades are connected to the rotor to the distal end portions. On the other hand, in the propeller thrust generating device 3, the edge on the axial direction upper side of a second rotor blade 60*b* moves downward toward the distal ends of the blades. The size of a gap increases toward the distal ends of the blades. Therefore, at the distal end portions of the blades, the gap is larger than the distance in the axial direction between the first stator 31 and the second stator 41. However, in the bases where the blades are connected to the rotor, the gap is smaller than the distance in the axial direction between the first stator 31 and the second stator 41, as in the case of the first preferred embodiment.

Modification of the Third Preferred Embodiment

Figure 6:
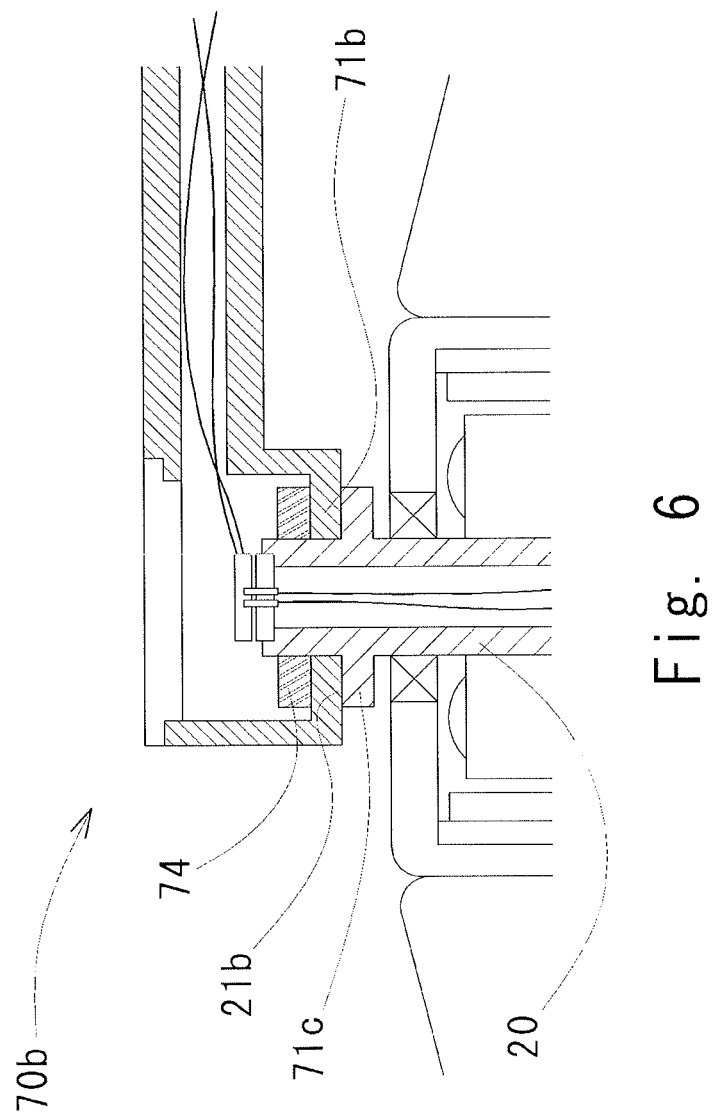
FIG. 6 is an enlarged view showing of a fixed section of a propeller thrust generating device according to another preferred embodiment of the present invention.

A modification of the propeller thrust generating device is shown in FIG. 6. In this example, the structure of an attaching section 70*b* that fixes the fixed shaft 20 to the supporting arm 10 is different. The other portions are the same as the portions shown in FIG. 4.

In this modification, the attaching section 70*b* does not include a portion that spreads in the axial direction of the fixed shaft 20. However, an inner circumferential rim 71*b* includes a portion that spreads in the radial direction. The fixed shaft 20 includes a flange 71*c* in the upper end portion. The flange 71*c* and the nut 74 sandwich the inner circumferential rim 71*b* to fix the fixed shaft 20 to the supporting arm 10.

Note that, in this modification, the spreading in the radial direction of the flange 71*c* and the inner circumferential rim 71*b* are larger than the spreading in the radial direction of the upper end face 21*b* of the fixed shaft 21 in the third preferred embodiment. Therefore, by fixing the flange 71*c* and the inner circumferential rim 71*b* in a state in which the flange 71*c* and the inner circumferential rim 71*b* are in contact with each other, it is possible to reduce deviation in a fixing direction of the fixed shaft 20 to the supporting arm 10.

Fourth Preferred Embodiment

Figure 7:
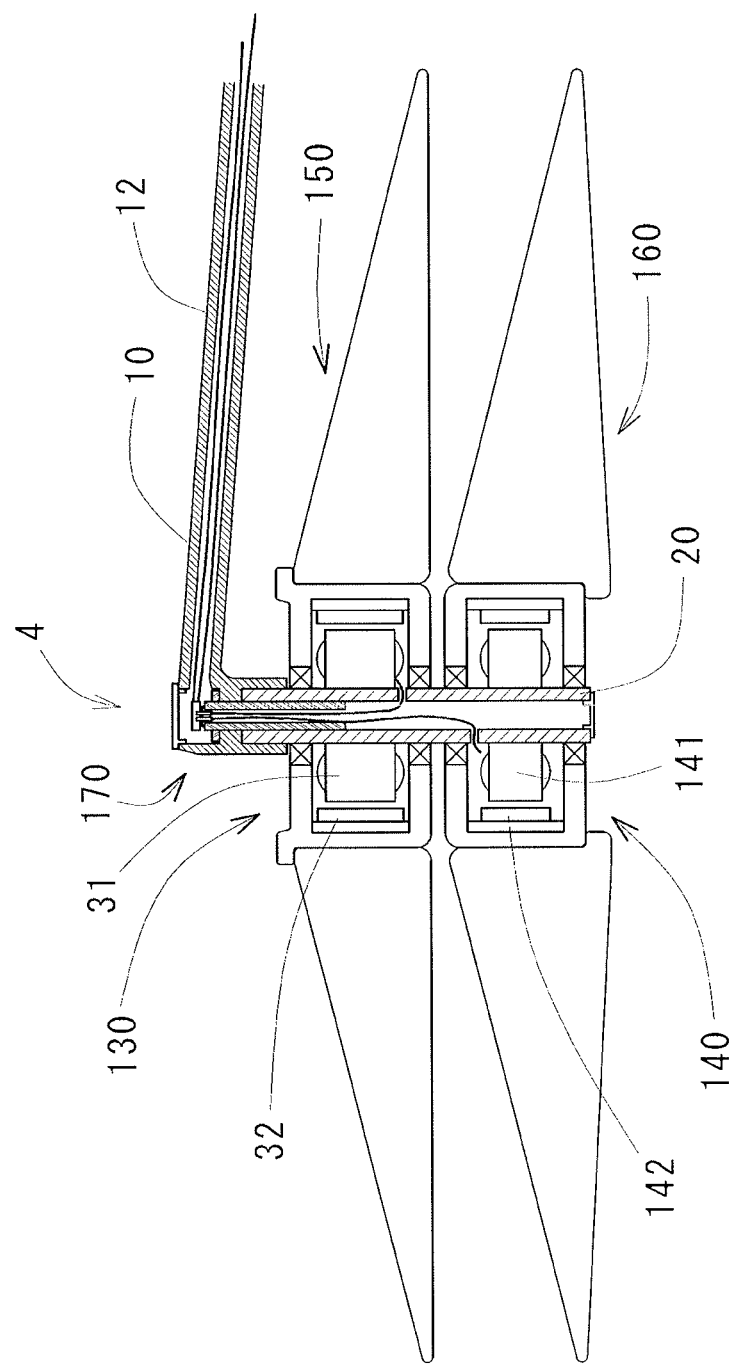
FIG. 7 is an axial direction sectional view schematically showing a basic configuration of a propeller thrust generating device according to a fourth preferred embodiment of the present invention.

In FIG. 7, an axial direction sectional view of a propeller thrust generating device 4 according to a fourth preferred embodiment of the present invention is shown. The propeller thrust generating device 4 according to this preferred embodiment is preferably different from the propeller thrust generating devices in the other preferred embodiments explained above mainly in the rotor blades 150 and 160, a second stator 141, and a second rotor magnet 142. Explanation concerning portions same as the portions in the other preferred embodiments is omitted.

In this preferred embodiment, maximum torque that can be generated by the second stator 141 and the second rotor magnet 142 is smaller than maximum torque that can be generated by the first stator 31 and the first rotor magnet 32. This is a configuration obtained as a result of improving a configuration in which rotor blades having opposite rotating directions are disposed close to each other. In this case, shapes different from each other are selected for the first rotor blade 150 and the second rotor blade 160.

When materials and magnetization states of a core and a coil defining a stator and a permanent magnet defining a rotor magnet are the same, if required torque is small, it is possible to reduce the volumes of the stator and the rotor magnet. Therefore, in FIG. 7, the axial direction heights of the second stator 141 and the second rotor magnet 142 are smaller than the axial direction heights of the first stator 31 and the first rotor magnet 32.

Figure 8:
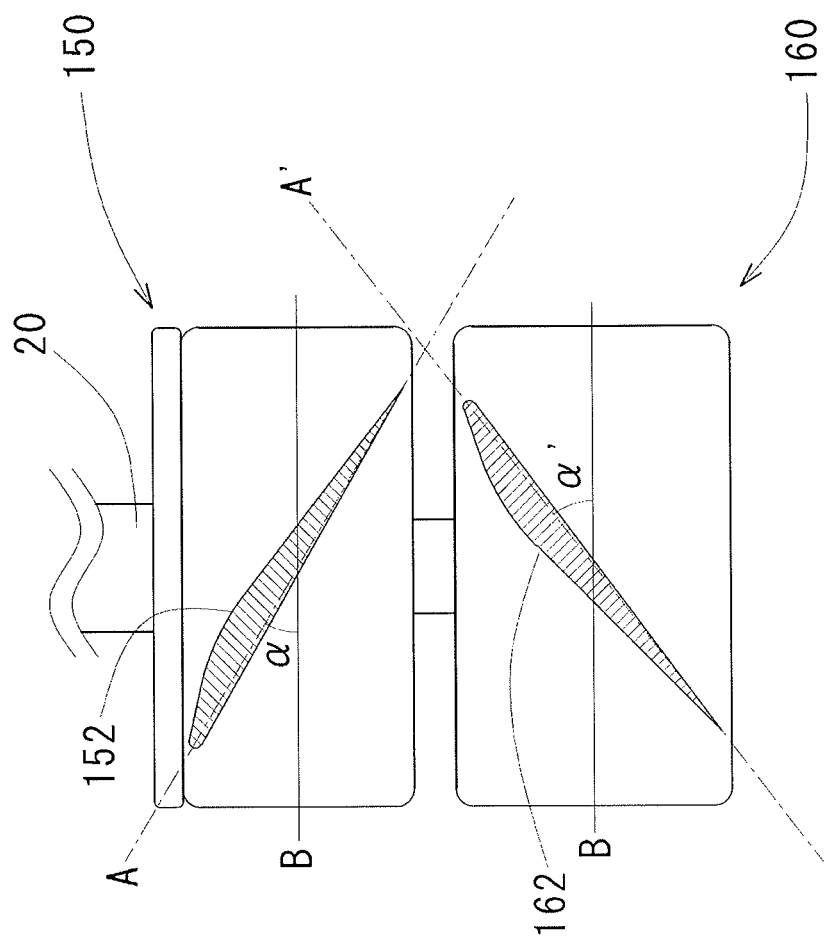
FIG. 8 is a schematic diagram showing a state of angles of elevation of rotor blades of the propeller thrust generating device according to the fourth preferred embodiment of the present invention.

In FIG. 8, a view of the propeller thrust generating device 4 viewed from a side of the fixed shaft 20 is shown. In FIG. 8, a first rotor 130 is driven toward the left direction and a second rotor 140 is driven toward the right direction. B and B' in the figure respectively indicate straight lines parallel to the driving directions. A and A' indicate straight lines connecting the front edges and the rear edges in cross sections of the blades. Note that the cross sections of the blades indicate cross sections at the time when respective blades 152 of the first kind defining the first rotor blade 150 and respective blades 162 of the second kind defining the second rotor blade 160 are respectively cut along a surface parallel to the axis of the fixed shaft 20.

As it is evident from FIG. 8, an angle α (an angle of elevation or a pitch) defined by the straight line A and the straight line B is smaller than an angle α' (an angle of elevation or a pitch) defined by the straight line A' and the straight line B'. The difference reflects the fact that a direction in which the air flows into the respective blades 152 of the first kind and the respective blades 162 of the second kind is different when the air above the rotor blade 150 flows into the rotor blade 150 and when the air passed through the rotor blade 150 flows into the rotor blade 160. That is, when the propeller thrust generating device 4 does not have relative speed in the axial direction with respect to the ambient air, an angle of the air flowing into the blades 152 of the first kind is equal to α in the figure. On the other hand, since the air is accelerated downward in the axial direction by the first rotor blade 150, an angle of the air flowing into the blades 162 of the second kind is smaller than α' in the figure. In this way, in the first rotor blade 150 and the second rotor blade 160, the direction of the air flowing into the rotor blades 150 and 160 is different. Therefore, when there is no large difference between rotating speeds of the rotor blades 150 and 160, when α' is set larger than α, the second rotor blade 160 is able to be rotated under conditions more desirable to obtain thrust.

Figure 9A:
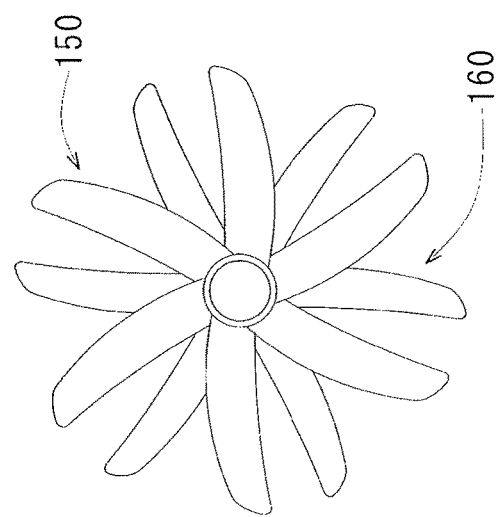
FIGS. 9A to 9C are schematic diagrams showing the shapes of the rotor blades of the propeller thrust generating device according to the fourth preferred embodiment of the present invention.
Figure 9B:
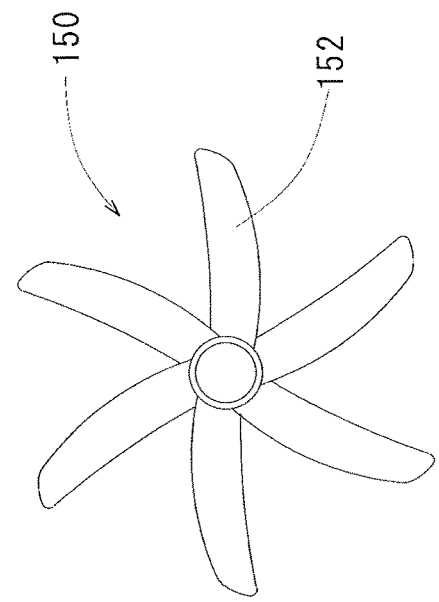
Figure 9C:
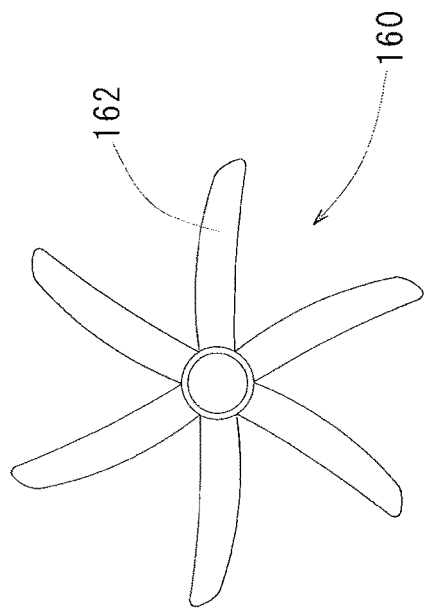

FIGS. 9A, 9B and 9C show preferred embodiments of the shapes of the first rotor blade 150 and the second rotor blade 160 viewed downward from above the fixed shaft 20. As shown in FIGS. 9B and 9C, the first rotor blade 150 and the second rotor blade 160 preferably include six blades 152 of the first kind and six blades 162 of the second kind. The blades 152 and 162 are radially disposed. The first rotor blade 150 is driven to rotate clockwise in the figures. The second rotor blade 160 is driven to rotate counterclockwise in the figures.

The distal end portions of the respective blades 152 of the first kind are located on the rear side in the rotating direction with respect to the bases. In other words, in FIG. 9B, when clockwise rotation torque is applied to the first rotor and the first rotor blade by the first stator, the distal end portions of the blades 152 of the first kind are located on the counterclockwise side with respect to the bases. The distal end portions of the blades 162 of the second kind are located on the rear side in the rotating direction with respect to the bases. In other words, in FIG. 9C, when rotation torque in the counterclockwise direction is applied to the second rotor and the second rotor blade by the second stator, the distal end portions of the blades 162 of the second kind are located on the clockwise side with respect to the bases.

In FIG. 9B, the respective blades of the first kind have a shape convex toward the clockwise direction. The respective blades of the second kind have a shape convex toward the counterclockwise direction.

By adopting such a configuration, during the rotation driving, instances when the edges of the blades 152 of the first kind and the edges of the blades 162 of the second kind cross can be dispersed. Consequently, it is possible to reduce noise during the driving of the propeller thrust generating device 4.

FIG. 9A shows a state of the first rotor blade 150 and the second rotor blade 160 viewed along the axial direction of the fixed shaft 20. The two rotor blades having different inclinations and different convex directions are seen overlapping each other.

Modification of the Fourth Preferred Embodiment

Figure 10B:
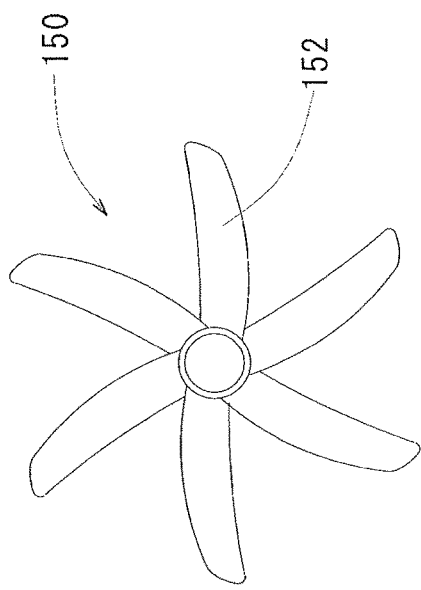
FIGS. 10A to 10C are schematic diagrams showing the shapes of rotor blades of the propeller thrust generating device according to a modification of the fourth preferred embodiment of the present invention.
Figure 10C:
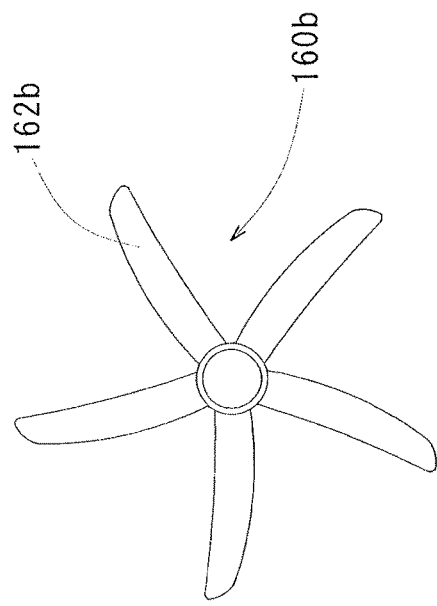
Figure 10A:
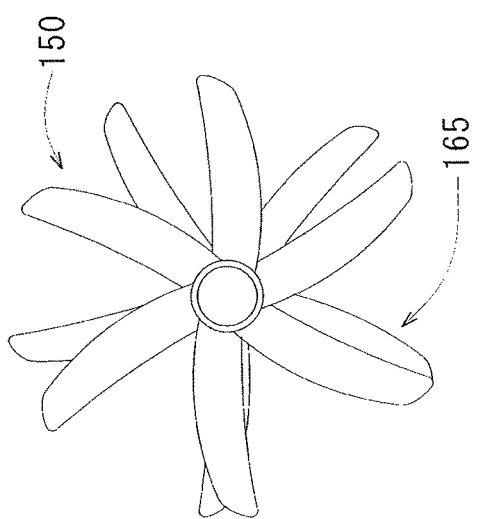

The rotor blades according to modifications of the fourth preferred embodiment are shown in FIGS. 10A, 10B, and 10C. As in FIGS. 9A to 9C, the shapes of rotor blades viewed downward from above the fixed shaft 20 are shown. The other parts are the same as the parts in the fourth preferred embodiment. The first rotor blade 150 shown in FIG. 10B is the same as the first rotor blade 150 shown in FIG. 9B. A second rotor blade 160b shown in FIG. 10C is different from the second rotor blade 160 shown in FIG. 9C. The number of blades defining the rotor blade is different. In the fourth preferred embodiment, the second rotor blade 160 preferably includes six blades 162 of the second kind. On the other hand, in this modification, the second rotor blade 160b preferably includes five blades 162 of the second kind. The shape of the respective blades 162 of the second kind is preferably the same as the shape in the fourth preferred embodiment. By differentiating the number of blades in the first rotor blade 150 and the second rotor blade 160b, it is possible to reduce noise during the driving of the propeller thrust generating device 4.

Note that, in the fourth preferred embodiment and the modification of the fourth preferred embodiment explained above, the angles of elevation (the pitches) of the blades defining the rotor blades are fixed. However, the rotor blades are not limited to this. Rotor blades having variable pitches (variable pitch propellers) may be adopted. However, even in that case, the rotor blades are desirably operated in a state in which the pitch of the second rotor blades is larger than the pitch of the first rotor blades. If the first rotor blade and the second rotor blade are completely the same, it is desirable to enable the second rotor blade to rotate at higher speed.

As described above, the present disclosure encompasses motors, and propeller thrust generating devices as recited in the following Items.

[item 1] A motor comprising:
a columnar fixed shaft;
a first rotor supported by the fixed shaft in a rotatable manner relative to the fixed shaft;
a first stator fixed to the fixed shaft and applying rotation torque to rotate the first rotor toward one side in a circumferential direction of the fixed shaft;
a second rotor provided in a position different from a position of the first rotor in an axial direction in a rotatable manner relative to the fixed shaft; and
a second stator fixed to the fixed shaft and applying rotation torque to rotate the second rotor toward another side in a circumferential direction of the fixed shaft.

[item 2] The motor according to item 1, wherein an interval between the first rotor and the second rotor is smaller than both of an axial direction height of the first stator and an axial direction height of the second stator.

[item 3] The motor according to item 1 or 2, further comprising
a first bearing; a second bearing; a third bearing; and a fourth bearing; wherein
the first bearing and the second bearing are interposed between the fixed shaft and the first rotor and support the first rotor in a rotatable manner relative to the fixed shaft;
the third bearing and the fourth bearing are interposed between the fixed shaft and the second rotor and support the second rotor in a rotatable manner relative to the fixed shaft; and
the first bearing, the second bearing, the third bearing, and the fourth bearing are disposed along the axial direction of the fixed shaft in this order.

[item 4] The motor according to item 3, wherein
the first stator is located between the first bearing and the second bearing; and
the second stator is located between the third bearing and the fourth bearing.

[item 5] The motor according to item 1, further comprising a rotating shaft; wherein
the second rotor is connected to another end of the rotating shaft;
the second rotor includes a hub section spreading outward in a radial direction from the other end of the rotating shaft;
the fixed shaft includes a cylinder section, an inner side of which is a hollow, at least on the other end side;
at least one end side of the rotating shaft is housed on the inner side of the cylinder section;
the first bearing and the second bearing are fixed to an outer circumferential surface of the fixed shaft in a position further on the one end side than the cylinder section;
the third bearing and the fourth bearing are fixed to an inner circumferential surface of the cylinder section; and
the third bearing and the fourth bearing are interposed between the rotating shaft and the cylinder section and support the rotating shaft in a rotatable manner relative to the cylinder section.

[item 6] The motor according to any one of items 1 to 5, further comprising:
a supporting arm, at least a portion of which extends in a direction crossing the axial direction of the fixed shaft; wherein
the supporting arm includes:
a hollow main section extending in a direction crossing the axial direction of the fixed shaft; and
a supporting-arm-side attaching section extending along the axial direction of the fixed shaft from a distal end portion of the main section;
the supporting-arm-side attaching section includes a cylindrical surface;
the fixed shaft includes a cylindrical surface at least at one end portion; and
the cylindrical surface at the one end portion of the fixed shaft is in contact with the cylindrical surface of the supporting-arm-side attaching section and fixed.

[item 7] The motor according to any one of items 1 to 6, wherein
the fixed shaft includes a hollow section at least on one end side;
the hollow section opens at one end side of the fixed shaft;
the fixed shaft includes, on a side surface, at least one through-hole that reaches the hollow section;
the first stator includes a first coil including a conductor wire and a first lead wire extending from the first coil;
the second stator includes a second coil including a conductor wire and a second lead wire extending from the second coil; and
at least one of the first lead wire and the second lead wire enters the hollow section through the at least one through-hole and further reaches one end of the fixed shaft.

[item 8] The motor according to item 7, further comprising a power supply line, wherein
at least a portion of the power supply line is housed in the main section of the supporting arm and one end portion of the power supply line reaches the supporting-arm-side attaching section; and
an end portion of the lead wire reaching the one end of the fixed shaft is connected to an end portion of the power supply line.

[item 9] A propeller thrust generating device comprising:
the motor according to any one of items 1 to 8;
a first rotor blade including a plurality of blades of a first kind radially extending from the first rotor; and
a second rotor blade including a plurality of blades of a second kind radially extending from the second rotor.

[item 10] The propeller type thrust generating device according to item 9, wherein an interval in the axial direction between bases of the blades of the first kind and bases of the blades of the second kind is smaller than a gap between the first stator and the second stator in the axial direction.

[item 11] The propeller type thrust generating device according to item 9 or 10, wherein a pitch of the second rotor blade is larger than a pitch of the first rotor blade.

[item 12] The propeller type thrust generating device according to any one of items 9 to 11, wherein
when viewed from one side in the axial direction of the fixed shaft:
distal ends of the blades of the first kind are located on the other side in the circumferential direction of the fixed shaft with respect to bases; and
distal ends of the blades of the second kind are located on the one side in the circumferential direction of the fixed shaft with respect to bases.

[item 13] The propeller type thrust generating device according to any one of items 9 to 12, wherein
when viewed from one side in the axial direction of the fixed shaft:
each of the blades of the first kind has a shape convex toward the one side in the circumferential direction of the fixed shaft; and
each of the blades of the second kind has a shape convex toward the other side in the circumferential direction of the fixed shaft.

[item 14] The propeller type thrust generating device according to any one of items 9 to 13, wherein a number of the blades of the first kind defining the first rotor blade is larger than a number of blades of the second kind defining the second rotor blade.

[item 15] The propeller type thrust generating device according to any one of items 9 to 14, further comprising a supporting arm, at least a portion of which extends in a direction crossing the axial direction of the fixed shaft; wherein
in the axial direction, the first rotor blade is disposed on a side closer to the supporting arm than the second rotor blade; and
in the axial direction, an interval in the axial direction between bases of the blades of the first kind and bases of the blades of the second kind is smaller than an interval between the blades of the first kind and the supporting arm at distal ends of the blades of the first kind.

The motors and the counter-rotating propeller thrust generating devices including the motors according to various preferred embodiments of the present invention can be used for the purpose of inducing a flow in the axial direction not only in the air but also in water and in other kinds of fluid. The motors and the counter-rotating propeller thrust generating devices according to various preferred embodiments of the present invention can also be used for the purpose of obtaining a rotation driving force in general rather to induce a flow.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
a columnar fixed shaft;
a first rotor supported by the fixed shaft in a rotatable manner relative to the fixed shaft;
a first stator fixed to the fixed shaft and applying rotation torque to rotate the first rotor toward one side in a circumferential direction of the fixed shaft;
a second rotor provided in a position different from a position of the first rotor in an axial direction in a rotatable manner relative to the fixed shaft; and
a second stator fixed to the fixed shaft and applying rotation torque to rotate the second rotor toward another side in a circumferential direction of the fixed shaft; wherein
the fixed shaft is a single monolithic member; and
the first rotor and the second rotor are both rotationally supported by only the fixed shaft.

2. The motor according to claim 1, further comprising:
a first bearing;
a second bearing;
a third bearing; and
a fourth bearing; wherein
an interval between the first rotor and the second rotor is smaller than both of an axial direction height of the first stator and an axial direction height of the second stator;
the first bearing and the second bearing are interposed between the fixed shaft and the first rotor and support the first rotor in a rotatable manner relative to the fixed shaft;
the third bearing and the fourth bearing are interposed between the fixed shaft and the second rotor and support the second rotor in a rotatable manner relative to the fixed shaft;
the first bearing, the second bearing, the third bearing, and the fourth bearing are disposed along the axial direction of the fixed shaft in this order; and
the first stator is located between the first bearing and the second bearing; and
the second stator is located between the third bearing and the fourth bearing.

3. The motor according to claim 1, further comprising:
a rotating shaft;
a second bearing;
a third bearing; and
a fourth bearing; wherein
the second rotor is connected to one end of the rotating shaft;

the second rotor includes a hub section spreading outward in a radial direction from another end of the rotating shaft;
the fixed shaft includes a cylinder section, an inner side of which is a hollow, at least on the another end of the rotating shaft;
at least the another end of the rotating shaft is housed on the inner side of the cylinder section;
the first bearing and the second bearing are fixed to an outer circumferential surface of the fixed shaft in a position further on the one end than the cylinder section;
the third bearing and the fourth bearing are fixed to an inner circumferential surface of the cylinder section; and
the third bearing and the fourth bearing are interposed between the rotating shaft and the cylinder section and support the rotating shaft in a rotatable manner relative to the cylinder section.

4. The motor according to claim 1, further comprising:
a supporting arm, at least a portion of which extends in a direction crossing the axial direction of the fixed shaft; wherein
the supporting arm includes:
a hollow main section extending in a direction crossing the axial direction of the fixed shaft; and
a supporting-arm-side attaching section extending along the axial direction of the fixed shaft from a distal end portion of the main section;
the supporting-arm-side attaching section includes a cylindrical surface;
the fixed shaft includes a cylindrical surface at least at one end portion; and
the cylindrical surface at the one end portion of the fixed shaft is in contact with the cylindrical surface of the supporting-arm-side attaching section and fixed.

5. The motor according to claim 2, further comprising:
a supporting arm, at least a portion of which extends in a direction crossing the axial direction of the fixed shaft; wherein
the supporting arm includes:
a hollow main section extending in a direction crossing the axial direction of the fixed shaft; and
a supporting-arm-side attaching section extending along the axial direction of the fixed shaft from a distal end portion of the main section; wherein
the supporting-arm-side attaching section includes a cylindrical surface;
the fixed shaft has a cylindrical surface at least at one end portion; and
the cylindrical surface at the one end portion of the fixed shaft is in contact with the cylindrical surface of the supporting-arm-side attaching section and fixed.

6. The motor according to claim 1, wherein
the fixed shaft includes a hollow section at least on one end side;
the hollow section opens at one end side of the fixed shaft;
the fixed shaft includes, on a side surface, at least one through-hole that reaches the hollow section;
the first stator includes a first coil including a conductor wire and a first lead wire extending from the first coil;
the second stator includes a second coil including a conductor wire and a second lead wire extending from the second coil; and at least one of the first lead wire and the second lead wire enters the hollow section through the at least one through-hole and further reaches one end of the fixed shaft.

7. The motor according to claim 2, wherein
the fixed shaft includes a hollow section at least on one end side;
the hollow section opens at one end side of the fixed shaft;
the fixed shaft includes, on a side surface, at least one through-hole that reaches the hollow section;
the first stator includes a first coil including a conductor wire and a first lead wire extending from the first coil;
the second stator includes a second coil including a conductor wire and a second lead wire extending from the second coil; and
at least one of the first lead wire and the second lead wire enters the hollow section through the at least one through-hole and further reaches one end of the fixed shaft.

8. The motor according to claim 5, wherein
the fixed shaft includes a hollow section at least on one end side;
the hollow section opens at one end side of the fixed shaft;
the fixed shaft includes, on a side surface, at least one through-hole that reaches the hollow section;
the first stator includes a first coil made of a conductor wire and a first lead wire extending from the first coil;
the second stator includes a second coil made of a conductor wire and a second lead wire extending from the second coil; and
at least one of the first lead wire and the second lead wire enters the hollow section through the at least one through-hole and further reaches one end of the fixed shaft.

9. The motor according to claim 6, further comprising:
a supporting arm, at least a portion of which extends in a direction crossing the axial direction of the fixed shaft; and a power supply line; wherein
the supporting arm includes:
  a hollow main section extending in a direction crossing the axial direction of the fixed shaft; and
  a supporting-arm-side attaching section extending along the axial direction of the fixed shaft from a distal end portion of the main section;
at least a portion of the power supply line is housed in the main section of the supporting arm and one end portion of the power supply line reaches the supporting-arm-side attaching section; and
an end portion of the lead wire reaching the one end of the fixed shaft is connected to an end portion of the power supply line.

10. The motor according to claim 7, further comprising:
a supporting arm, at least a portion of which extends in a direction crossing the axial direction of the fixed shaft; and a power supply line; wherein
the supporting arm includes:
  a hollow main section extending in a direction crossing the axial direction of the fixed shaft; and
  a supporting-arm-side attaching section extending along the axial direction of the fixed shaft from a distal end portion of the main section;
at least a portion of the power supply line is housed in the main section of the supporting arm and one end portion of the power supply line reaches the supporting-arm-side attaching section; and
an end portion of the lead wire reaching the one end of the fixed shaft is connected to an end portion of the power supply line.

11. A propeller thrust generating device comprising:
the motor according to claim 1;
a first rotor blade including a plurality of blades of a first kind radially extending from the first rotor; and
a second rotor blade including a plurality of blades of a second kind radially extending from the second rotor.

12. A propeller thrust generating device comprising:
the motor according to claim 6;
a first rotor blade including a plurality of blades of a first kind radially extending from the first rotor; and
a second rotor blade including a plurality of blades of a second kind radially extending from the second rotor.

13. A propeller thrust generating device comprising:
the motor according to claim 8;
a first rotor blade including a plurality of blades of a first kind radially extending from the first rotor; and
a second rotor blade including a plurality of blades of a second kind radially extending from the second rotor.

14. The propeller thrust generating device according to claim 11, wherein an interval in the axial direction between bases of the blades of the first kind and bases of the blades of the second kind is smaller than a gap between the first stator and the second stator in the axial direction.

15. The propeller thrust generating device according to claim 12, wherein an interval in the axial direction between bases of the blades of the first kind and bases of the blades of the second kind is smaller than a gap between the first stator and the second stator in the axial direction.

16. The propeller thrust generating device according to claim 11, wherein a pitch of the second rotor blade is larger than a pitch of the first rotor blade.

17. The propeller thrust generating device according to claim 11, wherein
when viewed from one side in the axial direction of the fixed shaft:
  distal ends of the blades of the first kind are located on the other side in the circumferential direction of the fixed shaft with respect to bases; and
  distal ends of the blades of the second kind are located on the one side in the circumferential direction of the fixed shaft with respect to bases.

18. The propeller thrust generating device according to claim 11, wherein
when viewed from one side in the axial direction of the fixed shaft:
  each of the blades of the first kind has a shape convex toward the one side in the circumferential direction of the fixed shaft; and
  each of the blades of the second kind has a shape convex toward the other side in the circumferential direction of the fixed shaft.

19. The propeller thrust generating device according to claim 11, wherein a number of the blades of the first kind defining the first rotor blade is larger than a number of blades of the second kind defining the second rotor blade.

20. The propeller thrust generating device according to claim 13, wherein
in the axial direction, the first rotor blade is disposed on a side closer to the supporting arm than the second rotor blade; and
in the axial direction, an interval in the axial direction between bases of the blades of the first kind and bases of the blades of the second kind is smaller than an interval between the blades of the first kind and the supporting arm at distal ends of the blades of the first kind.

21. The motor according to claim 1, further comprising:
a gap between the first rotor and the second rotor; wherein
the gap is smaller than both of an axial direction height of the first stator and an axial direction height of the second stator.

22. The motor according to claim 2, wherein
a gap is located between the first rotor and the second rotor;
the gap is smaller than both of an axial direction height of the first stator and an axial direction height of the second stator; and
the size of the gap is smaller than an interval between the first stator and the second stator and equal or substantially equal to an interval between the second bearing and the third bearing.

* * * * *